United States Patent
Kang

(10) Patent No.: US 11,161,515 B1
(45) Date of Patent: Nov. 2, 2021

(54) ANTI-JERK CONTROL METHOD FOR ELECTRIC VEHICLE

(71) Applicants: Hyundai Motor Company, Seoul (KR); Kia Motors Corporation, Seoul (KR)

(72) Inventor: Tae Jun Kang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/035,161

(22) Filed: Sep. 28, 2020

(30) Foreign Application Priority Data

May 25, 2020 (KR) .......................... 10-2020-0062173

(51) Int. Cl.
*B60W 30/20* (2006.01)
*B60W 10/08* (2006.01)
*B60W 30/18* (2012.01)

(52) U.S. Cl.
CPC ............ *B60W 30/20* (2013.01); *B60W 10/08* (2013.01); *B60W 30/18063* (2013.01); *B60W 30/18072* (2013.01); *B60W 2530/10* (2013.01); *B60W 2540/10* (2013.01); *B60W 2540/18* (2013.01); *B60W 2552/15* (2020.02); *B60W 2710/083* (2013.01); *B60W 2710/1005* (2013.01)

(58) Field of Classification Search
CPC ................. B60W 30/20; B60W 10/08; B60W 2710/083; B60W 2540/10; B60W 30/18027; B60W 30/18063; B60W 30/30; B60W 30/18072; B60W 2530/10; B60W 2552/15; B60W 2540/18
See application file for complete search history.

(56) References Cited

U.S. PATENT DOCUMENTS

| 8,874,297 B2 * | 10/2014 | Bang ....................... B60L 50/16 701/22 |
| 2017/0313299 A1 * | 11/2017 | Yun .................. B60W 30/18027 |
| 2019/0381895 A1 * | 12/2019 | Shindo .................. B60W 10/08 |
| 2020/0266753 A1 * | 8/2020 | Strandberg .............. H02P 29/50 |

FOREIGN PATENT DOCUMENTS

| CN | 107839688 A * | 3/2018 |
| KR | 101117970 B1 | 2/2012 |
| KR | 10-2019-0158424 | 12/2019 |

* cited by examiner

*Primary Examiner* — Roger L Pang
(74) *Attorney, Agent, or Firm* — Mintz Levin Cohn Ferris Glovsky and Popeo, P.C.; Peter F. Corless

(57) ABSTRACT

An anti-jerk control method for an electric vehicle incorporates an anti-jerk function that can be performed more accurately and effectively by utilizing a real-time weight change of an electric vehicle. The anti-jerk control method includes: estimating vehicle weight by a controller based on vehicle driving information collected from a vehicle; determining a required torque command of a driver by the controller based on the vehicle driving information collected from the vehicle; determining anti-jerk torque according to the vehicle weight based on calculated speed deviation and the estimated vehicle weight information; and controlling a drive motor according to a compensated motor torque command by compensating the required torque command with the anti-jerk torque in the controller.

15 Claims, 3 Drawing Sheets

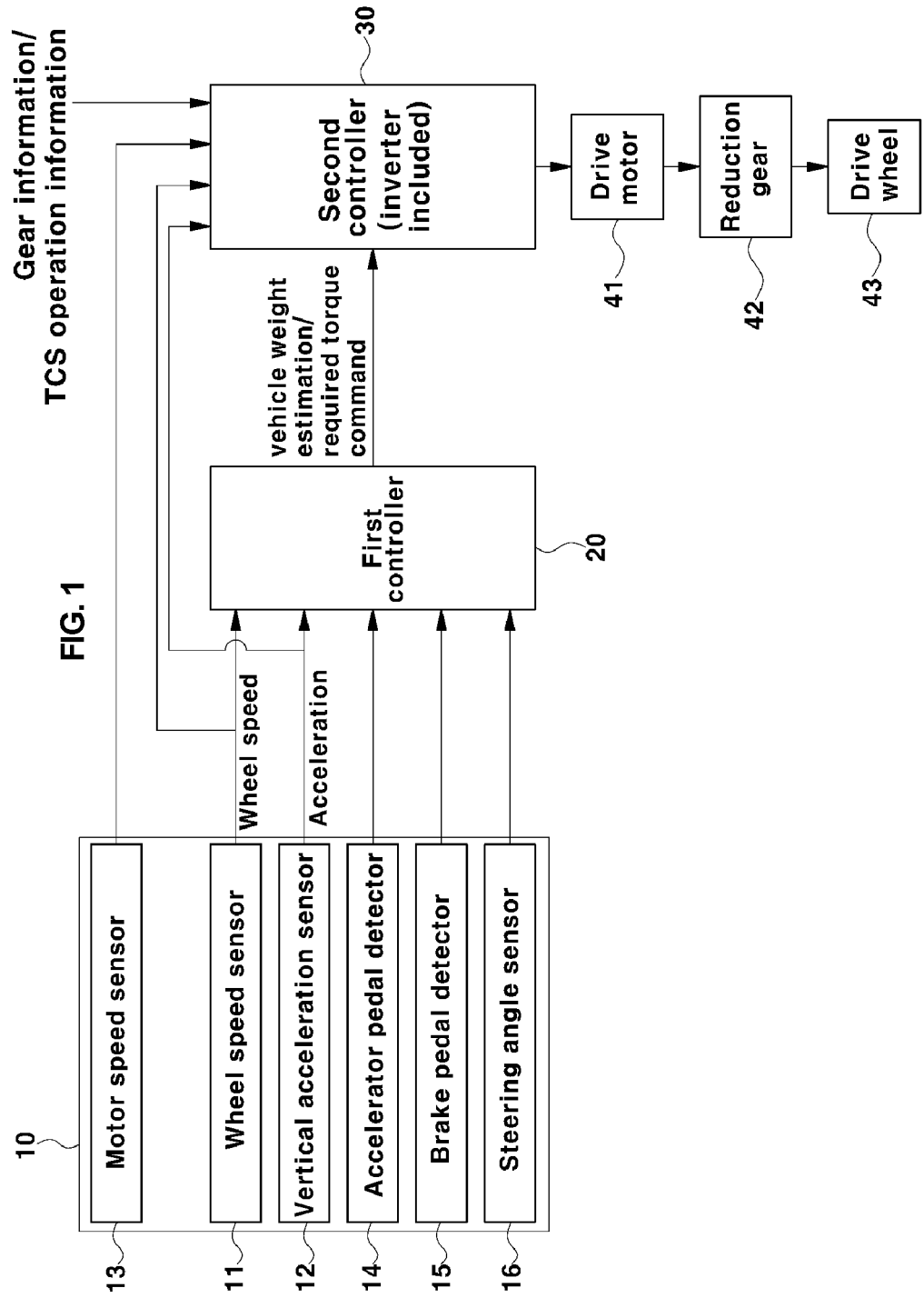

ANTI-JERK CONTROL METHOD FOR ELECTRIC VEHICLE

CROSS REFERENCE TO RELATED APPLICATION

The present application claims under 35 U.S.C. § 119(a) the benefit of Korean Patent Application No. 10-2020-0062173, filed May 25, 2020, the entire contents of which are incorporated by reference herein.

BACKGROUND

(a) Technical Field

The present disclosure generally relates to an anti-jerk control method for an electric vehicle, more particularly, to the anti-jerk control method in which a weight change of the electric vehicle driven by a motor is utilized to perform anti-jerk control more accurately and effectively.

(b) Description of the Related Art

As is known, an electric vehicle (EV) is a vehicle (a motorized vehicle or a motor-driven vehicle) that is driven by a motor as the source (a driving source) of a driving force for driving the vehicle.

A drivetrain of the electric vehicle includes: a battery that supplies power to drive the motor; an inverter connected to the battery to drive and control the motor; the motor as a driving source connected to the battery through the inverter such that the battery can be charged and discharged; and a reduction gear that decelerates a rotational force of the motor and transmits the decelerated rotational force to a drive wheel.

The inverter functions to convert a direct current (DC) supplied from the battery during motor drive into an alternating current (AC), to apply the AC to the motor through a power cable, and to convert an alternating current generated by the power generation operation of the motor during motor regeneration into a direct current so that the direct current is supplied to the battery so as to charge the battery.

Such an electric vehicle is vulnerable to surge in a low-speed region due to the characteristics of the system thereof, so anti-jerk technology is applied to alleviate this surge.

In an electric vehicle, as a damping element is excluded or becomes smaller, during tip-in/out (stepping on or off an accelerator pedal), vibration such as shock and jerk (a momentary and rapid movement) occurs along with vibration of a drive shaft, which causes a reduction in ride comfort and drivability.

Also, in the electric vehicle, since the damping element existing between the motor which is a torque source and the drivetrain is excluded or is small, vibration from the torque source or vibration from the outside is not decreased.

To solve such a problem, anti-jerk control technology which suppresses vibration by using an anti-jerk torque calculated relative to a model speed to control a motor torque output is known.

According to such an anti-jerk control method, when a vehicle starts again after stopping, anti-jerk control is performed by a controller, so the surge of a motor speed and the jerk of the drivetrain that may occur in the initial stage of vehicle departure can be reduced.

In the case of a commercial electric vehicle as a motorized commercial vehicle such as an electric truck or an electric bus, a change in the total weight of the vehicle due to passengers or loads is greater than that of a passenger electric vehicle.

As such, when the total weight of a vehicle is large, various behavior characteristics are changed. When the total weight of a vehicle is changed even on the same road surface, at the same speed, and in the same environmental condition, surge characteristics transmitted to a driver are also changed.

Anti-jerk control of an electric vehicle was first applied to a passenger electric vehicle. Since the amount of the total weight change of a vehicle according to the number or load of passengers is not large in the passenger electric vehicle, differentiation according to vehicle weight is not required during the anti-jerk control.

Alternatively, since the amount of total vehicle weight change is great in the commercial electric vehicle, the amount of the total vehicle weight change must be taken into consideration. However, conventionally, only an anti-jerk function developed based on no load condition is known.

As loads on a vehicle increase, the characteristics of the vehicle may be changed, and thus the surge characteristics of the vehicle may also be changed accordingly. Since the existing anti-jerk function is performed based on the condition in which a vehicle is not loaded, it is difficult to effectively reduce surges in the commercial electric vehicle.

Accordingly, in the commercial electric vehicle, an effective anti-jerk technology performing anti-jerk function in consideration of the change of total weight thereof is required.

SUMMARY

Accordingly, the present disclosure proposes an anti-jerk control method for an electric vehicle, in which an anti-jerk function can be performed more accurately and effectively by utilizing the real-time weight change of the electric vehicle when the electric vehicle is driven by a motor.

In order to achieve the above objective, according to an embodiment of the present disclosure, there is provided an anti-jerk control method for an electric vehicle, the method including: estimating vehicle weight by a controller based on vehicle driving information collected from a vehicle; determining a required torque command of a driver by the controller based on the vehicle driving information collected from the vehicle; determining anti-jerk torque according to the vehicle weight based on calculated speed deviation and the estimated vehicle weight information after calculating the speed deviation between a model speed and an actual speed of a motor in the controller; and controlling a drive motor according to a compensated motor torque command by compensating the required torque command with the anti-jerk torque in the controller.

Accordingly, according to the anti-jerk control method of the present disclosure, in a commercial electric vehicle, it is possible to more effectively alleviate surges in various conditions by performing a differentiated anti-jerk control according to the weight of a vehicle in consideration of changes in the weight of the vehicle.

Particularly, according to the present disclosure, in a commercial electric vehicle such as a bus or truck with large change in the number of passengers and the weight of loaded cargo, total vehicle weight is accurately estimated in real time, and then the estimated weight is accurately reflected to perform the anti-jerk control, thereby maximizing a surge suppression effect.

In addition, according to the present disclosure, surge vibration of a commercial electric vehicle may be reduced, thereby reducing a driver's fatigue and improving the safety of cargo.

Further, according to the present disclosure, a non-transitory computer readable medium containing program instructions executed by a processor includes: program instructions that estimate vehicle weight based on vehicle driving information collected from a vehicle; program instructions that determine a required torque command of a driver based on the vehicle driving information collected from the vehicle; program instructions that determine anti-jerk torque according to the vehicle weight based on calculated speed deviation and the estimated vehicle weight information after calculating the speed deviation between a model speed and an actual speed of a motor; and program instructions that control a drive motor according to a compensated motor torque command by compensating the required torque command with the anti-jerk torque.

BRIEF DESCRIPTION OF THE DRAWINGS

The above and other objects, features, and other advantages of the present disclosure will be more clearly understood from the following detailed description when taken in conjunction with the accompanying drawings, in which:

FIG. 1 is a block diagram illustrating the configuration of a system performing an anti-jerk control process according to the present disclosure.

DETAILED DESCRIPTION OF THE DISCLOSURE

Figure 2A:
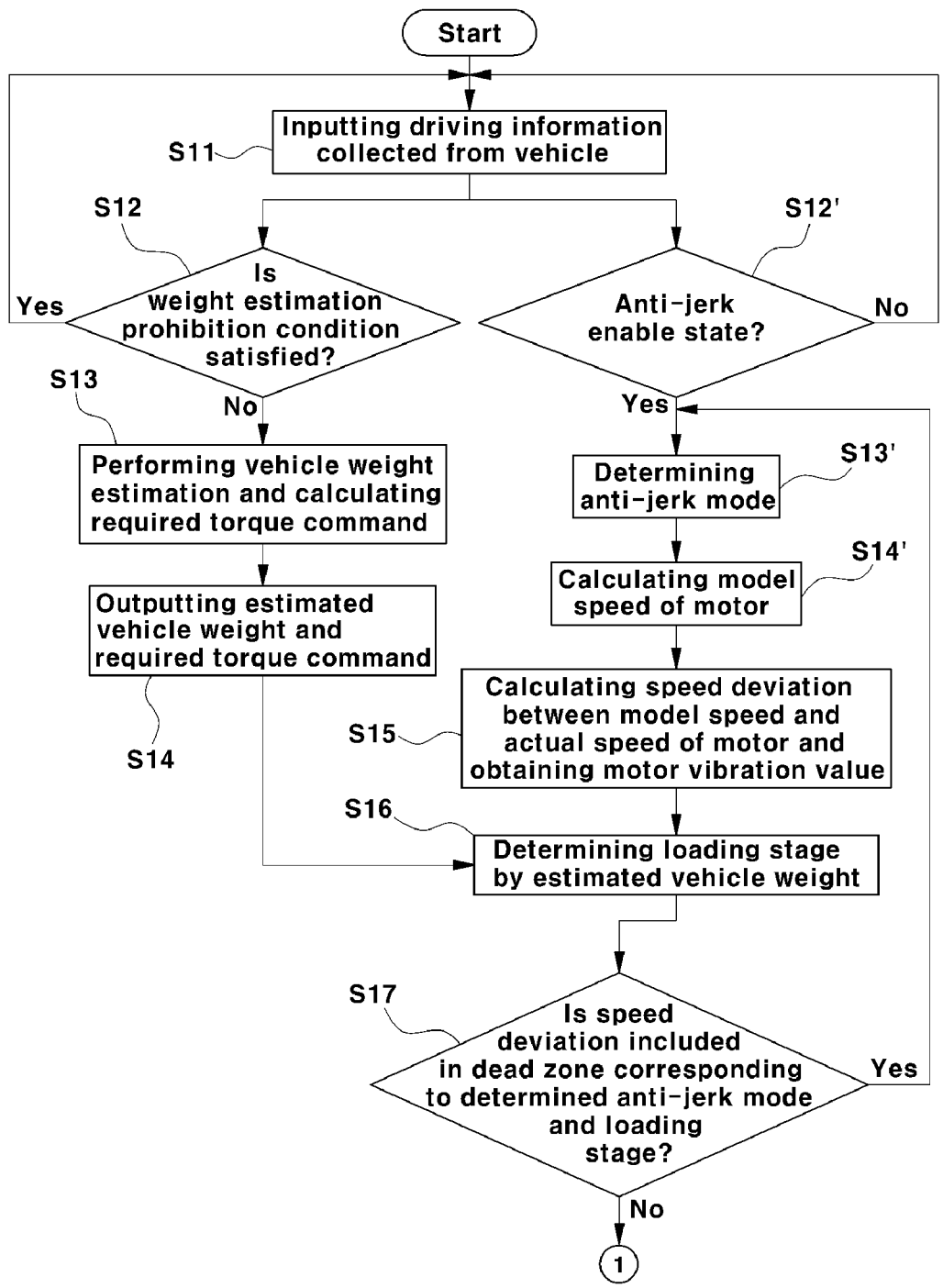
FIG. 2A and FIG. 2B are a flowchart illustrating the anti-jerk control process according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an embodiment of the present disclosure will be described in detail with reference to the accompanying drawings so that those skilled in the art to which the present disclosure belongs can easily practice the embodiment. However, the present disclosure is not limited to the embodiment described herein, but may be embodied in other forms.

As described above, in a commercial electric vehicle such as a bus or truck, the number of passengers and the weight of loaded cargo may be significantly changed during vehicle driving, so anti-jerk control technology in which the total weight change of the vehicle is taken into consideration is required.

To this end, in the commercial electric vehicle in which the total weight change of a vehicle is large, it is necessary to accurately detect a current vehicle weight in real time and to perform anti-jerk control according to the current vehicle weight.

The present disclosure is characterized in that after the total weight of a vehicle during driving is accurately estimated in real time, the estimated total vehicle weight is reflected to perform the anti-jerk control.

Accordingly, when the anti-jerk control is performed according to the total weight of a vehicle, surges in various conditions can be effectively alleviated, and a surge suppression effect can be maximized.

In the following description, vehicle weight refers to the total weight of a vehicle in which the weight of passengers or the weight of cargo is added to the weight of the vehicle when the passengers are present or the cargo is loaded therein.

FIG. 1 is a block diagram illustrating the configuration of a system performing an anti-jerk control process according to the present disclosure, and, along with an anti-jerk control system, shows a drive motor 41 driving a vehicle, a reduction gear 42 reducing the rotational force of the motor 41 and transmitting the reduced rotational force, and a drive wheel 43 rotated by the rotational force of the motor transmitted by the reduction gear 42.

The anti-jerk control process according to the present disclosure may be performed by the cooperative control of a plurality of controllers provided in a vehicle. However, the anti-jerk control process may be performed by one integrated control element. In the following description, the anti-jerk control process is performed by the cooperative control of a first controller 20 and a second controller 30.

In the following description, a control subject is divided into the first controller 20 and the second controller 30. However, it can be understood that the plurality of controllers or the integrated control element is commonly referred to as a controller, and the anti-jerk control process according to the present disclosure is performed by the controller.

Figure 2B:
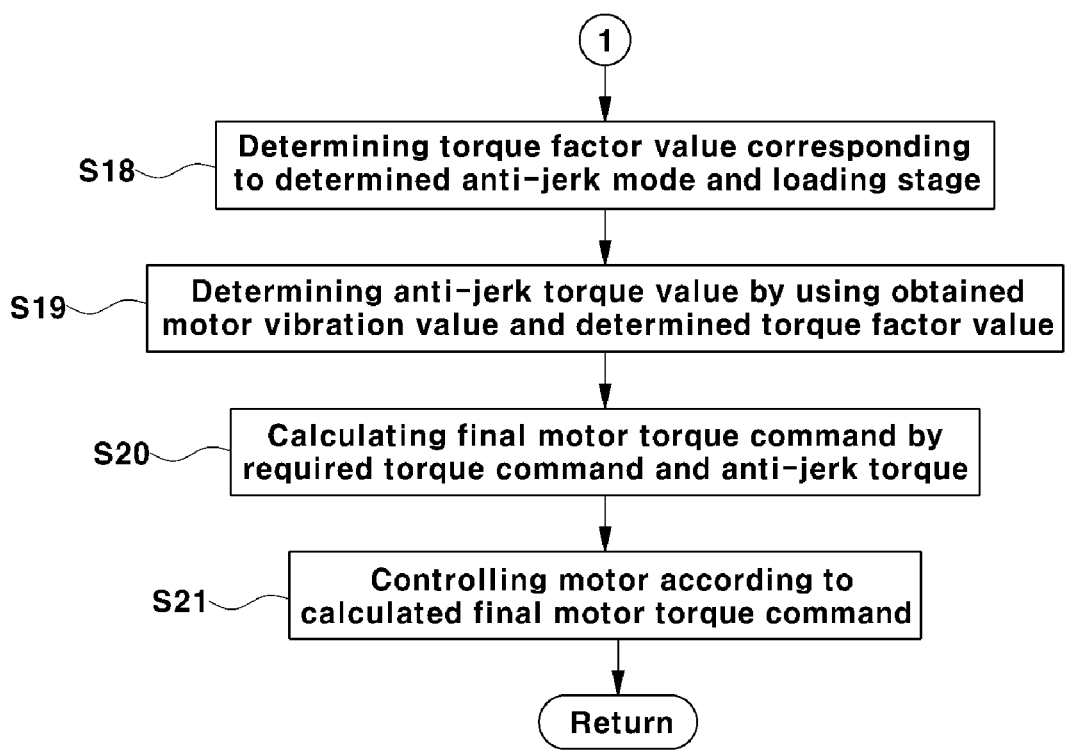

FIGS. 2A and 2B are a flowchart illustrating the anti-jerk control process according to the present disclosure. While the configuration of the system in FIG. 1 is described, the anti-jerk control process will be described with reference to FIGS. 2A and 2B.

Referring to FIG. 1, the anti-jerk control system according to the present disclosure includes the first controller 20 estimating the vehicle weight from a vehicle driving information collected from a vehicle during driving, and the second controller 30 performing the anti-jerk control according to the vehicle weight by using the vehicle weight information estimated by the first controller 20.

In the present disclosure, the first controller 20 may be a vehicle control unit (VCU) that determines and generates a required torque command of a driver from the vehicle driving information and outputs the required torque command.

In the present disclosure, the first controller 20 calculates the required torque command of the driver in real time based on driving input information of the driver and vehicle state information of the vehicle driving information determined during vehicle driving, and estimates the vehicle weight in real time to transmit the calculated required torque command and the estimated vehicle weight to the second controller 30.

In addition, in the present disclosure, the second controller 30 may be a motor control unit (MCU) that operates an inverter with a motor torque command and controls the motor 41.

In a normal electric vehicle, a controller performing the anti-jerk control is the motor control unit. After the motor control unit determines anti-jerk torque, the required torque command received by the vehicle control unit is compensated with the anti-jerk torque, and the motor is controlled with the compensated motor torque command.

However, in the present disclosure, the second controller 30 (for example, a motor control unit) is provided to receive the estimated vehicle weight information from the first controller 20 (for example, a vehicle control unit) and to perform the anti-jerk control according to the vehicle weight.

In the present disclosure, known weight estimation methods may be used for vehicle weight estimation. Many vehicle weight estimation methods of using the vehicle driving information collected from a vehicle are known, and any one of the known weight estimation methods may be applied.

According to the embodiment of the present disclosure, in the first controller 20, the vehicle driving information required for the vehicle weight estimation may include a vehicle speed, acceleration, and a motor torque.

The vehicle speed and the acceleration of the vehicle driving information required for the vehicle weight estimation are detected by a driving information detector 10 of the vehicle. The driving information detector 10 may include sensors detecting the vehicle speed and the acceleration.

A sensor of the driving information detector 10 detecting the vehicle speed may be a wheel speed sensor 11 mounted to a vehicle wheel. It is known that wheel speed and vehicle speed information can be obtained from the signal of the wheel speed sensor 11.

For example, the signals of wheel speed sensors 11 mounted to a plurality of wheels in a vehicle may be used. In this case, when an average speed is obtained by averaging the rotational speeds (the wheel speeds) of the wheels obtained from the signals of the wheel speed sensor 11, real-time vehicle speed information can be obtained from the average speed of the wheels.

In addition, a sensor of the driving information detector 10 detecting acceleration may be a vertical acceleration sensor 12 mounted to a vehicle. In this case, the acceleration is real time vertical acceleration information of the vehicle detected by the vertical acceleration sensor 12.

The vertical acceleration detected by the vertical acceleration sensor 12 is used to obtain the gradient information of a road on which a vehicle currently drives, and the road gradient (a road slope angle, θ) information is used to estimate the weight of the vehicle.

Accordingly, the road gradient θ can be obtained by using the vertical acceleration information detected by the vertical acceleration sensor 12, and in this case, can be obtained by further using vehicle acceleration. The vehicle acceleration can be obtained by differentiating the vehicle speed.

For example, the road gradient θ can be calculated by an equation "θ=1/g×(the vertical acceleration−vehicle acceleration)". Here, g refers to gravitational acceleration.

Such a method of calculating the road gradient θ is merely an example, and the present disclosure is not limited thereto, and any method in which real-time gradient information of a road on which a vehicle is currently driving can be obtained may be applied.

For example, a road gradient information at a current vehicle position can be obtained from a GPS signal received through a GPS receiver of a vehicle and 3D map information, and the weight of the vehicle can be estimated by using the road gradient information obtained in this case.

In addition, the motor torque of the driving information for the vehicle weight estimation may be a motor torque command used to control a drive motor.

The vehicle driving information required to determine the motor torque command includes driving input information of a driver and the vehicle state information. Here, the driving input information of the driver may include an accelerator pedal input value (APS value) and a brake pedal input value (BPS value), and the vehicle state information may include the vehicle speed.

The vehicle driving information required to determine the motor torque command can be detected by the driving information detector 10 of a vehicle. To this end, the driving information detector 10 may further include an accelerator pedal detector 14 detecting the accelerator pedal input information according to the state of the accelerator pedal manipulation by a driver, and a brake pedal detector 15 detecting the brake pedal input information according to the state of the brake pedal manipulation by the driver.

Here, the accelerator pedal detector 14 may be a known accelerator position sensor (APS) that is mounted to the accelerator pedal and outputs an electrical signal according to the state of the accelerator pedal manipulation by the driver.

Furthermore, the brake pedal detector 15 may be a known brake pedal sensor (BPS) which is mounted to a brake pedal and outputs an electrical signal according to the state of the brake pedal manipulation by the driver.

Finally, the first controller 20 can estimate the current weight information of a vehicle based on the real time driving information of the vehicle speed, the road gradient, and the motor torque command. Equation 1 below shows an example of a formula in which the vehicle weight can be estimated.

$$m = \frac{\int_{t0}^{t1} \left[ \frac{\eta_{RD}}{r_{tire}} (\tau_{Mot}^{BeAj}) - (f_o + f_1 v + f_2 v^2) \right] dt}{\left[ \Delta v - \int_{t0}^{t1} g \sin\theta \, dt \right]} \quad \text{[Equation 1]}$$

Here, m refers to vehicle weight, i refers to efficiency of the reduction gear, and $r_{tire}$ refers to a dynamic radius of a tire.

Furthermore, in Equation 1, $\tau_{Mot}^{BeAj}$ refers to the motor torque, which may be the motor torque command used to control the drive motor 41.

In addition, in Equation 1, fo, f1, and f2 refer to driving loads, v refers to the vehicle speed, g refers to the gravitational acceleration, and θ refers to the road gradient.

Although the method and equation of estimating the vehicle weight are described, the present disclosure is not limited to the weight estimation method and the above equation. Any known methods or equations of accurately estimating vehicle weight may be applied to the present disclosure.

For example, the first controller 20 receives the value of the acceleration and can calculate the vehicle weight by using a vehicle driving force F and the value of the acceleration a In "F=m×a", it is possible to calculate m corresponding to the vehicle weight by using "F/a".

In addition, as another example of estimating vehicle weight, a patent application entitled "Vehicle Weight Estimation Method by Acceleration Sensor" (Korean Patent Application No. 10-2019-0158424, filed on Oct. 8, 2019) was filed by the applicant of the subject application, and this vehicle weight estimation method may be applied to the present disclosure.

In addition, in the present disclosure, a weight estimation prohibition condition may be set in the first controller 20, and the weight estimation prohibition condition may include a condition in which the road gradient is at least a set value, and a condition in which a steering angle is at least a set angle.

That is, when the road gradient is at least the set value and the steering angle is at least the set angle, the weight estimation prohibition condition is determined to be satisfied, so the first controller 20 does not perform the vehicle weight estimation. Accordingly, the anti-jerk control in which an estimated vehicle weight is taken into consideration is not performed.

In this case, the existing motor control or anti-jerk control may be performed without using the estimated vehicle weight.

Alternatively, when the weight estimation prohibition condition is not satisfied, the vehicle weight estimation is performed, and then the anti-jerk control in which the estimated vehicle weight is taken into consideration is performed.

As described above, to determine whether the weight estimation prohibition condition is satisfied, the driving information detector 10 may further include a steering angle sensor 16 detecting the steering angle according to the state of the steering wheel manipulation by the driver.

Meanwhile, as described above, the first controller 20 calculates the required torque command of the driver in real time based on the driving input information of the driver and the vehicle state information during vehicle driving. The driving input information of the driver may include the accelerator pedal input value (APS value) and the brake pedal input value (BPS value), and the vehicle state information may include the vehicle speed.

In the first controller 20, the required torque command can be determined based on the APS value and the BPS value of the driver which reflect the demands of the driver, and a current vehicle speed information.

As provided herein, the process or method of calculating the required torque command is not different from the process and method in which the vehicle control unit calculates the required torque command by using the driving information of a vehicle collected in real time in a normal electric vehicle, and is a known technology, so detailed description thereof will be omitted.

Finally, as described above, the current vehicle weight estimated by the first controller 20 and the required torque command calculated thereby are transmitted to the second controller 30 in real time.

Referring to FIGS. 2A and 2B, it can be seen that a process in which the driving information collected from a vehicle is input to the first controller 20 and the second controller 30 at S11, a process in which whether the weight estimation prohibition condition is satisfied is determined in the first controller 20 at S12, a process in which when the weight estimation prohibition condition is not satisfied, the vehicle weight estimation is performed in the first controller 20 at S13, and a process in which the estimated vehicle weight and the required torque command are output from the first controller 20 at S14 are performed.

Prior to performing the anti-jerk control, the second controller 30 determines whether the anti-jerk control can be currently performed, that is, whether an anti-jerk enable state is satisfied, based on the vehicle driving information at S12'. In this case, the vehicle driving information may include gear information (P, R, N, and D gear information) and transaction control system (TCS) operation information.

Here, the gear information may be input from a shift controller (not shown) or a shift lever detector (not shown).

Although the shift lever detector is not shown in FIG. 1, when the second controller 30 is provided to receive the gear information (shift lever position information) directly from the shift lever detector, the driving information detector 10 of FIG. 1 further includes the shift lever detector.

The shift lever detector detects the shift lever position information (P, K N, and D gear information) according to the state of the shift lever manipulation by the driver.

In the present disclosure, the second controller 30 determines that the anti-jerk enable state is not satisfied when a gear is a P gear, which is a parking gear, or an N gear, which is a neutral gear, and does not perform the anti-jerk control.

In addition, during TCS operation, it is determined that the anti-jerk enable state is not satisfied, and the anti-jerk control is not performed.

Alternatively, when a gear is not the P gear or the N gear, that is, when TCS is not operating while a current gear is a D gear, which is a driving gear, or an R gear, which is a rearward gear, it is determined that the anti-jerk enable state is satisfied.

When the anti-jerk enable state is determined to be satisfied as described above, the second controller 30 determines an anti-jerk mode by using the current driving information of a vehicle at S13'.

In the present disclosure, for the effective control of the anti-jerk, the anti-jerk mode may be classified according to driving conditions. The anti-jerk mode is classified to differentiate the anti-jerk torque according to the driving condition of a vehicle, and may be a mode corresponding to braking, acceleration, a constant speed, or an anti-jerk inhibition condition.

For example, in the present disclosure, the anti-jerk mode may include at least two modes of an anti-jerk off mode (an "AJ 0" mode), a brake mode (an "AJ 1" mode), a tip-in mode (an "AJ 2" mode), and a tip-out mode (an "AJ 3" mode).

The anti-jerk off mode is a mode in which the anti-jerk control is off, and the brake mode is an anti-jerk mode of a time at which braking is performed due to the driver's pressing of a brake pedal.

A case in which the anti-jerk control is off may be determined as a case in which a predetermined anti-jerk inhibition condition is satisfied, or as a case in which a current gear is the P gear which is a parking gear, or the N gear which is a neutral gear even in a case which does not correspond to the anti-jerk inhibition condition.

In addition, the tip-in mode is an anti-jerk mode (torque increase) of a time at which the driver tips in the accelerator pedal, and the tip-out mode is an anti-jerk mode (torque decrease) of a time at which the driver tips out the accelerator pedal.

In the above description, the anti-jerk mode has been described to include a total of four modes, but this is merely an example, and the present disclosure is not limited thereto. The anti-jerk mode may be variously changed in the type or number thereof, the definition of each mode thereof, and a driving condition determined for each mode.

For example, in the present disclosure, the anti-jerk mode may include a creep mode in which the motor torque changes within a predetermined range for a set time instead of the anti-jerk off mode. In this case, the anti-jerk mode may include at least two modes of the brake mode, the tip-in mode, the tip-out mode, and the creep mode.

Next, when the anti-jerk mode is determined, the second controller 30 determines the anti-jerk torque value in which the current vehicle weight is taken into consideration by using the estimated vehicle weight received from the first controller 20 at S14' to S19, and next, determines a final motor torque command by compensating the required torque command received from the first controller 20 with the anti-jerk torque at S20.

When the final motor torque command is determined as described above, the second controller 30 operates the inverter according to the motor torque command and controls the motor 41 at S21.

Referring to FIGS. 2A and 2B, to determine the anti-jerk torque value in which the vehicle weight is taken into consideration, in the second controller 30, the model speed of the motor is calculated at S14', speed deviation between the model speed and actual speed of the motor is calculated, and motor vibration value is obtained through the deviation between the model speed and actual speed of the motor at S15.

In addition, as described hereinafter, in the second controller 30, a current loading stage is determined through the estimated vehicle weight at S16, a dead zone corresponding to the determined anti-jerk mode and loading stage is determined, and whether the speed deviation is included in the dead zone is checked at S17.

Next, when the speed deviation is not included in the dead zone, in the second controller 30, a torque factor value corresponding to the anti-jerk mode and the loading stage is determined at S18, and then the anti-jerk torque value is determined by using the motor vibration value and the torque factor value at S19.

The process of determining the anti-jerk torque will be described in more detail as follows.

The anti-jerk torque is a torque preventing the vibration (shock & jerk) of a drivetrain which may occur during the speed increasing/decreasing of a vehicle. The anti-jerk torque of a motor-driven vehicle (an electric vehicle) can be calculated by using the real-time driving information of a vehicle. Here, the driving information may include information on the wheel speed and a motor speed detected by sensors 11 and 12, respectively.

In addition to the motor speed and the wheel speed, the acceleration value of a vehicle may be used. The acceleration, together with the wheel speed, may be used to calculate the model speed of the motor.

The motor speed is the rotational speed of the motor detected by a motor speed sensor 13. In the anti-jerk control, the motor speed detected by the motor speed sensor 13 is the actual speed of the motor.

The motor speed sensor 13 may be a normal resolver mounted to the motor 41 (the drive motor) of an electric vehicle.

The wheel speed is the rotational speed of the wheel detected by the wheel speed sensor 11. The wheel speed is used to calculate the model speed of the motor, whereby in the second controller 30, the anti-jerk torque can be calculated based on the actual speed and model speed of the motor.

In the present disclosure, as described hereinafter, the anti-jerk torque according to the vehicle weight is obtained by further using the estimated vehicle weight obtained from the first controller 20.

In an electric vehicle (a motor-driven vehicle) in which the anti-jerk control is performed, the motor torque command for a motor control may be determined to be the sum value of the required torque command according to the driver's demands and the anti-jerk torque for vibration reduction as in Equation 2 below (S20 of FIG. 2B). This can be applied even to the present disclosure in the same way.

$$\text{Motor torque command} = \text{Required torque command} + \text{Anti-jerk torque.} \quad [\text{Equation 2}]$$

When calculating the anti-jerk torque, the model speed means the motor speed at which vibration is ignored, and may mean an equivalent wheel speed obtained by converting the wheel speed detected by the wheel speed sensor 11 into the speed of the motor 41 by using a gear ratio between the motor and the wheel.

The model speed may be referred to as the value of a reference speed required for the anti-jerk control of the motor, and the anti-jerk control is a control offsetting the speed fluctuation of the motor. For such anti-jerk control, the reference speed is required to determine how much the motor speed fluctuation is.

Such model speed may be a speed calculated in reverse from the wheel speed to a value related to the motor by using the wheel speed.

When calculating the model speed, in addition to the wheel speed, a vehicle acceleration value may be further used to improve anti-jerk control performance. Accordingly, the anti-jerk control can be performed in advance by predicting the change of the model speed calculated by using the acceleration value.

Since such a calculation process of the model speed is also a technology known through the known anti-jerk control, the detailed description thereof will be omitted in this specification.

The method of calculating the model speed includes a wheel speed-based calculation method, and a wheel speed estimation calculation method as a method to use the anti-jerk more actively. During wheel speed estimation, the acceleration value is used.

Furthermore, as described above, in the present disclosure, the anti-jerk torque can be determined by the actual speed and model speed of the motor 41, and value corresponding to the estimated vehicle weight (that is, the estimated vehicle weight of the first controller) in the second controller 30.

More particularly, when a current motor speed (that is, the current actual speed of a motor) is detected by the motor speed sensor 13, and the current model speed of the motor based on the wheel speed detected by the wheel speed sensor 11 is obtained, the anti-jerk torque can be calculated based on the model speed and actual speed of the motor, and the estimated vehicle weight of the first controller.

In the present disclosure, the anti-jerk torque may be determined to be value corresponding to the deviation between the model speed and actual speed of the motor. The motor vibration value can be obtained by using the deviation between the model speed and actual speed of the motor, and the anti-jerk torque value is determined based on the motor vibration value.

In this case, the anti-jerk torque value can be calculated by multiplying the motor vibration value by the torque factor value. Here, the torque factor value is determined according to the current vehicle weight (the estimated vehicle weight).

In the present disclosure, the process and method of obtaining the motor vibration value by using the deviation between the model speed and actual speed of the motor is not different from the known process and method of obtaining the motor vibration value, and the motor vibration value may be determined by the known calculation process and method.

Meanwhile, in the present disclosure, for the effective control of the anti-jerk, the anti-jerk mode maybe classified into several modes according to driving conditions. The anti-jerk mode is classified to differentiate the anti-jerk torque according to the driving condition of a vehicle, and may be a mode corresponding to braking, acceleration, a constant speed, or an anti-jerk inhibition condition.

For a specific example, in the present disclosure, the anti-jerk mode may include the anti-jerk off mode (the "AJ 0" mode), the brake mode (the "AJ 1" mode), the tip-in mode (the "AJ 2" mode), and the tip-out mode (the "AJ 3" mode).

The anti-jerk off mode is an anti-jerk mode in which the anti-jerk control is off, and the brake mode is an anti-jerk mode of a time at which braking is performed due to the driver's pressing a brake pedal.

In addition, the tip-in mode is the anti-jerk mode (torque increase) of a time at which the driver tips in the accelerator pedal, and the tip-out mode is the anti-jerk mode (torque decrease) of a time at which the driver tips out the accelerator pedal.

In the above description, the anti-jerk mode has been described to include a total of four modes, but this is merely an example, and it is noted that the present disclosure is not limited thereto. The anti-jerk mode may be variously changed in the type or number thereof, the definition of each mode thereof, and the driving condition determined for each mode.

In addition, in the present disclosure, an anti-jerk dead zone may be set, and is a speed section in which the anti-jerk control is not used based on the speed deviation between the model speed and actual speed of the motor. The anti-jerk dead zone can be set based on the speed deviation for each anti-jerk mode.

In this case, the minimum speed and the maximum speed of a speed deviation range corresponding to the dead zone for each anti-jerk mode are predetermined, and a speed section between the minimum speed and the maximum speed set for each anti-jerk mode is a dead zone for each mode in which the anti-jerk is off.

In the present disclosure, the dead zone is an anti-jerk off section that is set to prevent an anti-jerk malfunction caused by disturbance at the extremely low speed of the motor.

In addition, the anti-jerk control is fundamentally applied in the motor-driven vehicle to solve a problem such as the vibration of a drivetrain caused by the fluctuation of the motor speed. While the motor speed is fluctuating, the anti-jerk torque is required to be applied to the vehicle to prevent such a problem.

However, under normal driving conditions, the motor speed fluctuation seldom occurs or disappears because the vehicle weight has changed. Typical cases affected by the change of the vehicle weight include a case in which a vehicle starts from a stationary state, and a case in which a vehicle operates at low speed.

In the case that a vehicle is heavy, when the driver inputs the intention to start the vehicle and transmits the intention to the vehicle, that is, when there is driving input for starting the vehicle, motor speed increases, but the vehicle is heavy and may not move.

Such a phenomenon occurs for a longer time before a vehicle wheel really moves compared to when a vehicle is light. In this case, the motor speed fluctuates.

In addition, when a vehicle is heavy, the torque factor value applied to the anti-jerk torque is increased such that the motor speed fluctuation is suppressed. The same is true when road traffic is heavy, particularly, when a vehicle drives at low speed by starting from an uphill road or when a vehicle moves backwards on a downhill road.

Accordingly, the torque factor value in which the vehicle weight is taken into consideration is required to be used when calculating the anti-jerk torque. Accordingly, in the present disclosure, the torque factor value corresponding to the current vehicle weight is determined and used to calculate the anti-jerk torque.

To this end, in the present disclosure, the second controller 30 is provided to determine the anti-jerk mode corresponding to a current driving condition through the driving information of a vehicle, and to determine the current loading stage of a vehicle by using a current vehicle weight value estimated by the first controller 20, that is, the estimated vehicle weight of the first controller.

In addition, the second controller 30 determines whether the speed deviation between the model speed and actual speed of the motor 41 corresponds to the current loading stage and the anti-jerk dead zone set in the anti-jerk mode.

When the second controller 30 determines that the speed deviation corresponds to the anti-jerk dead zone, the second controller 30 does not perform the anti-jerk control by maintaining the anti-jerk control in an inactive state.

Alternatively, when the second controller 30 determines that the speed deviation does not correspond to the anti-jerk dead zone, the second controller 30 performs the anti-jerk control. In this case, the torque factor value corresponding to the current loading stage and the anti-jerk mode is determined, and the anti-jerk torque is calculated by multiplying the motor vibration value corresponding to the speed deviation between the model speed and actual speed of the motor by the torque factor value.

In the present disclosure, a vehicle weight range is divided into a plurality of sections such that the current loading stage of a vehicle can be determined by the second controller 30 based on the vehicle weight estimated by the first controller 20, and then the loading stage of the vehicle is determined in advance for each divided section. The information of a weight section for each loading stage is input to the second controller 30 and is set therein.

In the second controller 30, a plurality of loading stages having different vehicle weight ranges are set. For example, the entire weight range of the vehicle, which can be changed when boarding a passenger or loading cargo, including an empty state of a vehicle may be divided into a total of four stages: an empty stage, a first loading stage, a second loading stage, and a third loading stage.

In this case, in the vehicle weight, the third loading stage may be set as the largest weight section, the second loading stage may be set as the next largest weight section, and the first loading stage may be set as the smallest weight section except for the empty state.

The weight section corresponding to each loading stage may vary depending on the characteristics of an applied vehicle, and each loading stage is not determined as a specific weight section.

In addition, the loading stage corresponding to the current weight value is determined by the second controller 20 based on the vehicle weight value estimated by the first controller 20. In this case, in order to prevent frequent changes in the loading stages, hysteresis having different boundary values for the entry and exit of each loading stage, the boundary values dividing each loading stage, is preferably set.

Table 1 below shows a map in which the torque factor value is set for each anti-jerk mode when the loading stage of the vehicle is in an empty state, and Table 2 and Table 3 show a map in which a dead zone minimum speed is set for each anti-jerk mode, and a map in which a dead zone maximum speed is set for each anti-jerk mode, respectively, when the loading stage of the vehicle is in an empty state.

TABLE 1

| Anti-jerk (AJ) mode | 0 | 1 | 2 | 3 | . |
|---|---|---|---|---|---|
| Torque factor | 0 | 0.3 | 0.2 | . | . |

TABLE 2

| Anti-jerk (AJ) mode | 0 | 1 | 2 | 3 | . |
|---|---|---|---|---|---|
| Speed deviation (rpm) | 0 | −7 | −5 | . | . |

TABLE 3

| Anti-jerk (AJ) mode | 0 | 1 | 2 | 3 | . |
|---|---|---|---|---|---|
| Speed deviation (rpm) | 0 | 7 | 5 | . | . |

According to the examples of Table 2 and Table 3, when the speed deviation (rpm), which is difference value between the model speed and actual speed of the motor, is between minimum speed −7 and maximum speed 7 (dead zone is −7 to 7 rpm) in a case in which a vehicle is empty and the anti-jerk mode is the brake mode ("AJ 1"), the anti-jerk control is not performed and is off.

In addition, according to the examples of Table 2 and Table 3, when the speed deviation (rpm) is between minimum speed −5 and maximum speed 5 (dead zone is −5 to 5 rpm) in the case in which the vehicle is empty and the anti-jerk mode is the tip-in mode ("AJ 2"), the anti-jerk control is not performed and is off.

Furthermore, according to the example of Table 1, in the case in which the vehicle is empty, the torque factor value is determined to be 0.3 in the case of the brake mode, and the torque factor value is determined to be 0.2 in the case of the tip-in mode.

Next, Table 4 below shows a map in which the torque factor value is set for each anti-jerk mode when the loading stage of a vehicle is the first loading stage, and Table 5 and Table 6 show a map in which the dead zone minimum speed is set for each anti-jerk mode, and a map in which the dead zone maximum speed is set for each anti-jerk mode, respectively, in the case of the first loading stage.

TABLE 4

| Anti-jerk (AJ) mode | 0 | 1 | 2 | 3 | . |
|---|---|---|---|---|---|
| Torque factor | 0 | 0.3 | 0.3 | . | . |

TABLE 5

| Anti-jerk (AJ) mode | 0 | 1 | 2 | 3 | . |
|---|---|---|---|---|---|
| Speed deviation (rpm) | 0 | −5 | −5 | . | . |

TABLE 6

| Anti-jerk (AJ) mode | 0 | 1 | 2 | 3 | . |
|---|---|---|---|---|---|
| Speed deviation (rpm) | 0 | 7 | 5 | . | . |

In the present disclosure, the torque factor value and the dead zone are determined by the maps, that is, a map in which the torque factor value is set according to the loading stage and the anti-jerk mode, and a map in which the minimum speed and the maximum speed of the dead zone are set for each anti-jerk mode. The maps are previously input to and stored in the second controller 30 to be used.

According to the examples of Table 5 and Table 6, when the speed deviation (rpm) is between the minimum speed −5 and the maximum speed 7 (the dead zone is −5 to 7 rpm) in a case in which the estimated vehicle weight corresponds to the first loading stage, and the anti-jerk mode is the brake mode ("AJ 1"), the anti-jerk control is not performed, and is off.

In addition, according to the examples of Table 5 and Table 6, when the speed deviation (rpm) is between the minimum speed −5 and the maximum speed 5 (the dead zone is −5 to 5 rpm) in a case in which the estimated vehicle weight corresponds to the first loading stage, and the anti-jerk mode is the tip-in mode ("AJ 2"), the anti-jerk control is not performed, and is off.

Furthermore, according to the example of Table 4, in the first loading stage, the torque factor value is determined to be 0.3 in the case of the brake mode, and the torque factor value is determined to be 0.3 even in the case of the tip-in mode.

Next, Table 7 below shows a map in which the torque factor value is set for each anti-jerk mode when the loading stage of a vehicle is the second loading stage, and Table 8 and Table 9 show a map in which the dead zone minimum speed is set for each anti-jerk mode, and a map in which the dead zone maximum speed is set for each anti-jerk mode, respectively, in the case of the second loading stage.

TABLE 7

| Anti-jerk (AJ) mode | 0 | 1 | 2 | 3 | . |
|---|---|---|---|---|---|
| Torque factor | 0 | 0.4 | 0.3 | . | . |

TABLE 8

| Anti-jerk (AJ) mode | 0 | 1 | 2 | 3 | . |
|---|---|---|---|---|---|
| Speed deviation (rpm) | 0 | −3 | −3 | . | . |

TABLE 9

| Anti-jerk (AJ) mode | 0 | 1 | 2 | 3 | . |
|---|---|---|---|---|---|
| Speed deviation (rpm) | 0 | 7 | 5 | . | . |

According to the examples of Table 8 and Table 9, when the speed deviation (rpm) is between the minimum speed −3 and the maximum speed 7 (the dead zone is −3 to 7 rpm) in a case in which the estimated vehicle weight corresponds to the second loading stage, and the anti-jerk mode is the brake mode ("AJ 1"), the anti-jerk control is not performed, and is off.

In addition, according to the examples of Table 8 and Table 9, when the speed deviation (rpm) is between the minimum speed −3 and the maximum speed 5 (the dead zone is −3 to 5 rpm) in a case in which the estimated vehicle weight corresponds to the second loading stage, and the anti-jerk mode is the tip-in mode ("AJ 2"), the anti-jerk control is not performed, and is off.

In addition, according to the example of Table 7, in the second loading stage, the torque factor value is determined to be 0.4 in the case of the brake mode, and the torque factor value is determined to be 0.3 in the case of the tip-in mode.

Next, Table 10 below shows a map in which the torque factor value is set for each anti-jerk mode when the loading stage of a vehicle is the third loading stage, and Table 11 and Table 12 show a map in which the dead zone minimum speed is set for each anti-jerk mode, and a map in which the dead zone maximum speed is set for each anti-jerk mode, respectively, in the case of the third loading stage.

TABLE 10

| Anti-jerk (AJ) mode | 0 | 1 | 2 | 3 | . |
|---|---|---|---|---|---|
| Torque factor | 0 | 0.5 | 0.4 | . | . |

TABLE 11

| Anti-jerk (AJ) mode | 0 | 1 | 2 | 3 | . |
|---|---|---|---|---|---|
| Speed deviation (rpm) | 0 | −2 | −2 | . | . |

TABLE 12

| Anti-jerk (AJ) mode | 0 | 1 | 2 | 3 | . |
|---|---|---|---|---|---|
| Speed deviation (rpm) | 0 | 7 | 5 | . | . |

According to the examples of Table 11 and Table 12, when the speed deviation (rpm) is between minimum speed −2 and a maximum speed 7 (the dead zone is −2 to 7 rpm) in a case in which the estimated vehicle weight corresponds to the third loading stage, and the anti-jerk mode is the brake mode ("AJ 1"), the anti-jerk control is not performed, and is off.

In addition, according to the examples of Table 11 and Table 12, when the speed deviation (rpm) is between the minimum speed −2 and the maximum speed 5 (the dead zone is −2 to 5 rpm) in a case in which the estimated vehicle weight corresponds to the third loading stage, and the anti-jerk mode is the tip-in mode ("AJ 2"), the anti-jerk control is not performed, and is off.

Furthermore, according to the example of Table 10, in the third loading stage, the torque factor value is determined to be 0.5 in the case of the brake mode, and the torque factor value is determined to be 0.4 even in the case of the tip-in mode.

In Table 1 to Table 12, "•" does not mean 0 (zero), but means an arbitrary number.

As can be seen from Table 1 to Table 12, in the present disclosure, the torque factor value for determining the anti-jerk torque for each loading stage, and the speed deviation range of the dead zone in which the anti-jerk control is off are set in advance, and further, the torque factor value and the speed deviation range of the dead zone for each anti-jerk mode are set in advance.

The values in Table 1 to Table 12 are exemplary, and the present disclosure is not limited thereto. The anti-jerk mode, the torque factor for each loading stage, the speed deviation range of the dead zone, and the minimum speed and maximum speed of the dead zone may be properly changed and tuned according to vehicle characteristics.

When the anti-jerk torque is excessively applied in the case that a vehicle is relatively light, unnecessary vibration may be applied to the drivetrain. Accordingly, as the vehicle weight corresponds to a lower loading stage, the torque factor value may be set to be lower, and the speed deviation range corresponding to the dead zone may be set as a wider range.

In addition, as the vehicle weight corresponds to a higher loading stage, the torque factor value may be set to be higher, and the speed deviation range corresponding to the dead zone may be set as a narrower range.

Each value in Table 1 to 12 may be changed according to vehicle characteristics, and thus is required to be set based on data obtained from conducting preliminary tests and evaluations for associated vehicles.

For example, the speed deviation range of the dead zone may be set to be wider or narrower according to the characteristics of the anti-jerk mode.

Furthermore, the reason why the dead zone is differentiated according to the vehicle weight (the loading stage) as described above is that there are times at which the anti-jerk control is required to be actively performed when the weight is heavy. When the anti-jerk control is actively performed, the absolute value of the minimum speed and the maximum speed of the dead zone is set to be small, and the speed deviation range of the dead zone in which the anti-jerk control is not performed and is off is reduced.

Although the exemplary embodiment of the present disclosure has been described in detail, the scope of the claims of the present disclosure is not limited thereto, and those skilled in the art will appreciate that various modifications, additions, and substitutions are possible, without departing from the scope and spirit of the disclosure as disclosed in the accompanying claims.

What is claimed is:

1. An anti-jerk control method for an electric vehicle, the method comprising:
   estimating vehicle weight by a controller based on vehicle driving information collected from a vehicle;
   determining a required torque command of a driver by the controller based on the vehicle driving information collected from the vehicle;

determining, by the controller, anti-jerk torque according to the vehicle weight based on calculated speed deviation and the estimated vehicle weight information after calculating the speed deviation between a model speed and an actual speed of a motor; and controlling, by the controller, a drive motor according to a compensated motor torque command by compensating the required torque command with the anti-jerk torque.

2. The method of claim 1, wherein a weight estimation prohibition condition is set in the controller, the weight estimation prohibition condition comprising a condition in which a gradient of a road on which the vehicle drives is at least a set value, and a condition in which a steering angle is at least a set angle, wherein estimating the vehicle weight, determining the required torque command, determining the anti-jerk torque, and controlling the drive motor are performed only when the weight estimation prohibition condition is not satisfied.

3. The method of claim 1, further comprising:

determining, by the controller, an anti-jerk mode corresponding to a current driving condition in a plurality of anti-jerk modes preset from the driving information collected from the vehicle, wherein in determining the anti-jerk torque according to the vehicle weight, a motor vibration value is obtained through the calculated speed deviation, a torque factor value is determined through the estimated vehicle weight and the determined anti-jerk mode, and the anti-jerk torque is determined through the obtained the motor vibration value and the determined torque factor value.

4. The method of claim 3, wherein in the controller, when a plurality of loading stages having different vehicle weight ranges are set, and a loading stage corresponding to the estimated vehicle weight is determined, the torque factor value corresponding to the determined anti-jerk mode and the loading stage is determined.

5. The method of claim 4, wherein the torque factor value is determined, by the controller, through a map in which the torque factor value is set according to the anti-jerk mode and the loading stage.

6. The method of claim 4, wherein, in the controller, the anti-jerk mode and a dead zone which is a speed deviation range in which anti-jerk control is off for each loading stage are set in advance, and when the speed deviation calculated through the model speed and actual speed of the motor is included in a speed deviation range of a dead zone corresponding to a current anti-jerk mode and loading stage, determining the anti-jerk torque according to the vehicle weight, and controlling the drive motor according to the compensated motor torque command are not performed.

7. The method of claim 6, wherein, in the controller, the speed deviation range of the dead zone corresponding to the current anti-jerk mode and loading stage is determined to be used by using a map in which the anti-jerk mode, and minimum speed and maximum speed of the speed deviation range for each loading stage are set.

8. The method of claim 6, wherein as a set vehicle weight of the plurality of loading stages corresponds to a higher loading stage, the speed deviation range of the dead zone is set as a narrower range.

9. The method of claim 6, wherein as a set vehicle weight of the plurality of loading stages corresponds to a higher loading stage, the torque factor value is set as a higher value.

10. The method of claim 3, wherein the plurality of anti-jerk modes includes at least two modes of a brake mode of a time at which the driver steps on a brake pedal, a tip-in mode of a time at which the driver tips in an accelerator pedal, a tip-out mode of a time at which the driver tips out the accelerator pedal, and a creep mode in which motor torque changes within a predetermined range for a set time.

11. The method of claim 1, wherein, in the controller, a plurality of loading stages having different vehicle weight ranges is set;

in determining the anti-jerk torque according to the vehicle weight, a motor vibration value is obtained by using the calculated speed deviation;

when a loading stage corresponding to the estimated vehicle weight is determined, a torque factor value corresponding to the determined loading stage is determined; and the anti-jerk torque is determined by using the obtained the motor vibration value and the determined torque factor value.

12. The method of claim 11, wherein, in the controller, a dead zone which is a speed deviation range in which anti-jerk control is off for each loading stage is set in advance, and when the speed deviation calculated by using the model speed and actual speed of the motor is included in the speed deviation range of the dead zone corresponding to a current loading stage, the anti-jerk control is inactive in the controller.

13. The method of claim 12, wherein as a set vehicle weight of the plurality of loading stages corresponds to a higher loading stage, the speed deviation range of the dead zone is set as a narrower range.

14. The method of claim 12, wherein as a set vehicle weight of the plurality of loading stages corresponds to a higher loading stage, the torque factor value is set as a higher value.

15. A non-transitory computer readable medium containing program instructions executed by a processor, the computer readable medium comprising:

program instructions that estimate vehicle weight based on vehicle driving information collected from a vehicle;

program instructions that determine a required torque command of a driver based on the vehicle driving information collected from the vehicle;

program instructions that determine anti-jerk torque according to the vehicle weight based on calculated speed deviation and the estimated vehicle weight information after calculating the speed deviation between a model speed and an actual speed of a motor; and program instructions that control a drive motor according to a compensated motor torque command by compensating the required torque command with the anti-jerk torque.

* * * * *